Sept. 9, 1930.  J. D. DAVIS  1,775,310
HYDRAULIC BRAKE
Filed March 30, 1929   2 Sheets-Sheet 1

Inventor
J. D. Davis,
By *Seward & Seward*
his Attorneys

Sept. 9, 1930.  J. D. DAVIS  1,775,310
HYDRAULIC BRAKE
Filed March 30, 1929    2 Sheets-Sheet 2
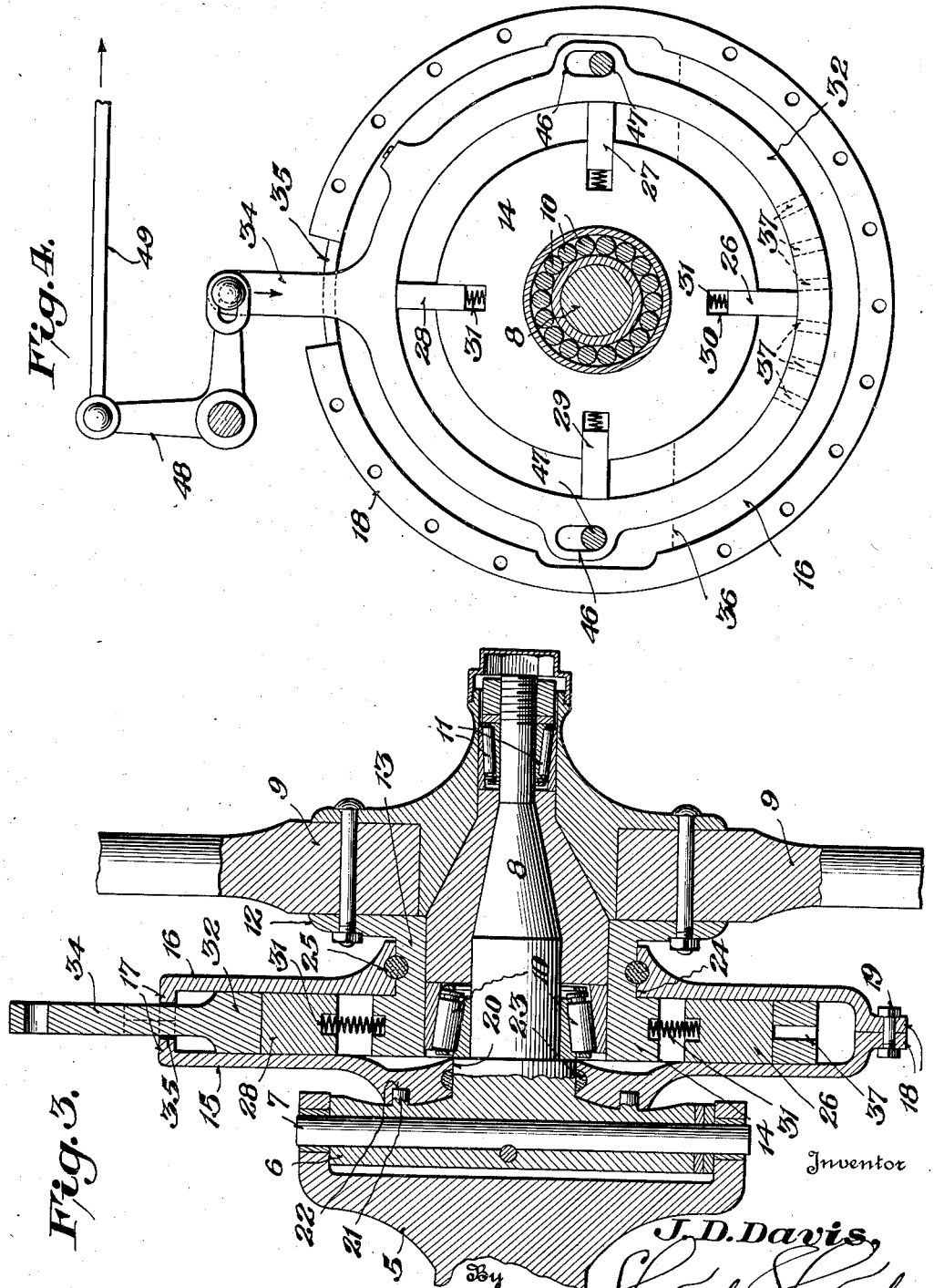

Patented Sept. 9, 1930

1,775,310

UNITED STATES PATENT OFFICE

JOHN DAUSE DAVIS, OF RICHMOND, VIRGINIA

HYDRAULIC BRAKE

Application filed March 30, 1929. Serial No. 351,396.

This invention is an hydraulic brake, and has for its object to provide a simple and improved construction for application to any rotatable member and especially designed for application to the wheels of automobiles without requiring any material changes therein, and to provide for the convenient control of the braking mechanism by the usual foot and hand controls commonly employed on automobiles.

The movable or operating parts of the present brake are few in number and are all housed in a fixed casing which contains the oil or other liquid which is manipulated so as to effect a braking action upon the automobile wheel or other object to which it is attached in a simple and efficient manner.

In the case of the front steering wheels, the fixed casing is mounted upon the swinging part of the steering knuckle, and the operating parts are associated with the automobile wheel by a direct connection therewith so as to be conveniently and effectively actuated thereby.

It will of course be understood that the principles of this invention are equally applicable to clutches.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Fig. 3 is a cross section of braking mechanism of the present invention mounted in connection with a steering wheel and its steering knuckle; and Fig. 4 is a side elevation, similar to Fig. 1 but showing a modification.

Figure 2:
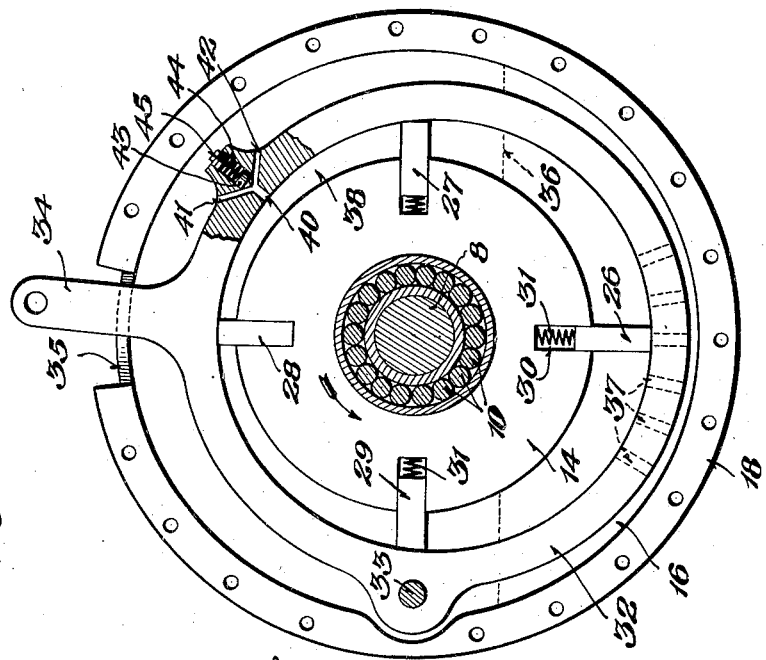
Fig. 2 is a view similar to Fig. 1 but showing the mechanism shifted into a braking position.

Referring at first to Fig. 3, it will be seen that the reference character 5 designates the fixed yoke-shaped part of a steering knuckle, carrying the upright knuckle member 6, mounted to rotate with or upon an upright pivot pin 7 having its opposite ends mounted in the arms of the yoke. The usual hub spindle 8 projects horizontally from the middle of the swinging knuckle member. These parts are common and well known and form no part of the present invention, and therefore may be varied at will. A wheel 9 of any preferred construction is mounted to rotate upon the spindle 8 and provided with inner and outer anti-friction devices 10 and 11 of any preferred construction and arrangement.

In applying the present invention, the inner hub plate 12, of the wheel, is provided with a hub portion 13 having a circular head 14 of materially greater diameter than the hub portion and constituting the rotor of the brake. This rotor is housed within a housing or casing made up of an inner half-section 15 and an outer half-section 16 spaced just sufficiently to give the rotor a working fit therebetween. These casing sections are of course circular in shape and are provided with laterally projecting marginal rims 17 which fit together and are provided with outstanding flanges 18 that are secured together by suitable fastenings 19 so as to form a tight joint to prevent the escape of oil. The casing section 15 has a spindle opening 20, and is secured to the swinging knuckle member 6 in any suitable manner, as by pins or projections 21 upon the knuckle member, and received in suitable seats or sockets 22 in the casing section 15. Suitable packing 23 is provided between the spindle 8 and the walls of the opening 20 in the casing section 15 to prevent the escape of oil. The other casing section 16 has a hub opening 24 to receive the hub part 13. A suitable packing 25 is provided between the casing section 16 and the hub part 13.

Figure 1:
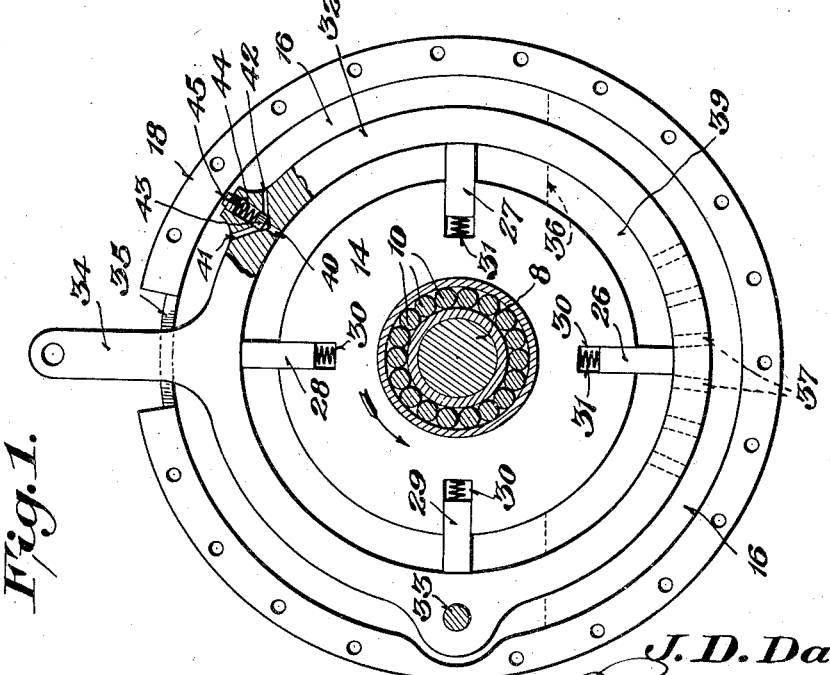
Figure 1 is a side elevation of an embodiment of the present invention, one of the half sections of the casing being removed, and the parts in neutral position.

A plurality of radial abutments 26, 27, 28 and 29 are mounted in suitable radial seats or slots 30 formed in the periphery of the rotor 14. Each abutment is mounted to slide radially and is under tension by a spring 31 bearing against the inner end of the abutment and the inner end of the seat or slot 30, so that the abutment is normally and yieldably urged outwardly into engagement with the inner periphery of a ring 32 which, as shown in Fig. 1, in the neutral condition of the brake is concentric with the casing and the rotor 14. As illustrated in Figs. 1 and 2, the ring 32 is pivotally hung at 33 upon the walls of the casing, so that it may be swung from its neutral concentric position to various eccentric positions, one such position being shown in Fig. 2, the slidable abutments accommodating themselves to the changing positions of the ring by reason of the springs 31. In its neutral position the ring 32 is about midway between the periphery of the rotor 14 and the rim 17 of the casing so as to permit of the ring being shifted in opposite directions. Shifting of the ring may be accomplished by means of the usual hand and foot controls connected to an arm 34 extending radially outward from the ring and extending through an opening or slot 35 in the top portion of the rim of the casing.

Oil or other liquid is contained in the bottom portion of the casing, the level thereof being indicated at 36. The bottom portion of the ring 32 is provided with substantially radial openings or ports 37 to afford communication between the casing spaces lying at opposite sides of the ring 32.

In the operation of the invention, with the parts in neutral, the oil lying between the ring 32 and the periphery of the rotor 14 will be carried freely around by the abutments. To apply the brake, the ring 32 is shifted to an eccentric position, as shown in Fig. 2, thereby contracting or reducing the space portion designated 38 between the ring and the periphery of the rotor into a tapered section tapering in the direction of rotation of the rotor. As the slug of oil contained in the lower space section 39, Fig. 1 is carried on up into the reduced and tapered space section 38, Fig. 2, and as the oil or other liquid is non-compressible there will be a wedging of the slug of oil between the outer periphery of the rotor and the inner periphery of the ring 32 and a consequent braking or retarding action applied to the rotor and through the hub part 13 to the wheel 9. To prevent actual and abrupt stopping of the rotor, an oil vent is provided, such as a vent port 40 opening radially through the inner periphery of the ring 32 and communicating with branch ports 41 and 42 meeting the main port 40 so as to produce a Y-shaped port. The intersection of the vent port branches provide a seat for a valve 43, mounted in the ring and yieldingly maintained seated by a spring 44 held in place by a screw plug 45 whereby the tension of the spring may be adjusted. As the oil is crowded into the restricted space 38, it will be vented through the ports 40, 41 and 42 sufficiently to permit the restricted rotation of the rotor resulting in a consequent retarding or braking action upon the wheel of the automobile. Such oil as is vented into the space outside of the ring 32, runs down into the bottom of the casing, where it again enters through the ports 37 into the space between the ring 32 and the rotor 14.

The slug of oil in the restricted space 38, which effects the braking action, is of course carried around over the top of the rotor from right to left and then downward at the left side of the rotor to the bottom of the casing without effecting any braking or retarding action on the rotor. By shifting the ring 32 to various positions, different braking effects may be obtained.

A slightly modified arrangement has been shown in Fig. 4 wherein the ring 32 is slidable instead of pivoted, and is provided with the slotted ears 46, the slots being tangential to the ring, and receiving pins or studs 47 extending between the walls of the casing and upon which the ring is slidably mounted. The arm 34 of the ring is connected to one arm of a bell-crank lever 48, the other arm of which is connected to a brake rod 49, whereby the ring may be slidably shifted to vary its eccentric position with respect to the rotor so as to obtain the same braking effects as described for the form shown in Figs. 1 and 2.

While the element 32 has been shown and described as a ring, its function is that of a wall encircling the periphery of the rotor and defining therewith an annular oil receiving chamber divided into sections by the abutments 26, 27, 28 and 29, such wall being concentric with the rotor in the neutral condition of the brake, and capable of being shifted into various eccentric positions so as to reduce or restrict one or more of the oil chamber sections defined by the rotor, the wall and a pair of successive abutments, whereby a slug of oil carried into a restricted chamber section will produce a retarding and braking effect upon the rotor and through the hub part 13 to the automobile wheel.

What is claimed is:

1. In a hydraulic brake, a casing, a rotor concentric within the casing and having peripheral abutments, a wall normally concentric with the rotor and spaced from the peripheries of the rotor and casing, said rotor and wall defining an annular chamber divided into sections by the abutments, and means to selectively change the relation of parts from concentric to eccentric and vice versa to reduce one of the chamber sections, and valve controlled means to vent said chamber section when it is reduced.

2. In a hydraulic brake, a casing, a rotor concentric within the casing and having peripheral abutments, a wall normally concentric with the rotor and spaced from the peripheries of the rotor and casing, said rotor and wall defining an annular chamber divided into sections by the abutments, and means to selectively change the relation of parts from concentric to eccentric and vice versa to reduce one of the chamber sections, and means to vent said chamber section when it is reduced, said means including a valved port extending thru the wall.

3. In a hydraulic brake, a casing, a rotor concentric within the casing and having peripheral abutments, a wall normally concentric with the rotor and spaced from the peripheries of the rotor and casing, said rotor and wall defining an annular chamber divided into sections by the abutments, and means to selectively change the relation of parts from concentric to eccentric and vice versa to reduce one of the chamber sections, and means to vent said chamber section when it is reduced, said means including a valved port extending thru the wall, the bottom portion of said wall having one or more passages thereto affording communication from the exterior to the interior of said wall.

4. In a hydraulic brake, a circular casing to contain a liquid, a circular rotor mounted concentric within the casing, a wall extending entirely around and normally concentric with the rotor and spaced from peripheries of the rotor and the casing, spring pressed abutments carried by and projecting radially from the rotor with their outer ends in slidable engagement with the inner periphery of the wall, said rotor and wall defining an annular chamber extending entirely around the rotor and divided into sections by the abutments, means to selectively change the relation of parts from concentric to eccentric and vice versa to reduce one of the chamber sections, and valve controlled means to vent said chamber section when it is reduced.

5. In a hydraulic brake, a circular casing, a circular rotor concentrically mounted within the casing and having peripheral abutments, a wall extending around and normally concentric with the rotor and spaced from the peripheries of the rotor and the casing, said rotor and wall defining an annular chamber extending around the rotor and divided into sections by the abutments, means for selectively moving the wall to change the relation of parts from concentric to eccentric and vice versa to reduce one of the chamber sections, and valve controlled means to vent said chamber section when it is reduced.

6. In a hydraulic brake, a casing having a circular interior, a rotor concentrically mounted within the casing and having peripheral abutments, a wall extending entirely around and normally concentric with the rotor and spaced from the external periphery of the rotor and the internal periphery of the casing, said rotor and wall defining an annular chamber extending entirely around the rotor and divided into sections by the abutments, said wall being pivotally mounted and capable of being swung on its pivotal mounting to change the relation of parts from concentric to eccentric and vice versa to reduce one of the chamber sections and to enlarge another of the chamber sections, valve controlled means to vent fluid pressure from the chamber section which is capable of being reduced to the annular space between the wall and the interior of the casing, there being other means for admitting fluid pressure from the exterior of the wall into the chamber section which is enlarged by the shifting of the wall.

7. In a hydraulic brake, a casing having a circular interior, a rotor concentrically mounted within the casing and having peripheral abutments engaging the interior of the casing, a wall extending entirely around and normally concentric with the rotor and spaced from the exterior periphery of the rotor and the interior periphery of the casing, said rotor and wall defining an annular chamber extending entirely around the rotor and divided into sections by the abutments, said wall being pivotally mounted for movement from concentric to eccentric relation with respect to the rotor to reduce one of the chamber sections, and valve controlled means to vent said chamber section when it is reduced.

JOHN DAUSE DAVIS.